US005480217A

United States Patent [19]
Ohtsu

[11] Patent Number: 5,480,217
[45] Date of Patent: Jan. 2, 1996

[54] ANTI-LOCK BRAKING SYSTEM

[75] Inventor: Nobuyuki Ohtsu, Atsugi, Japan

[73] Assignee: Unisia Jecs Corporation, Atsugi City, Japan

[21] Appl. No.: 308,515

[22] Filed: Sep. 21, 1994

[30] Foreign Application Priority Data

Sep. 22, 1993 [JP] Japan .................................. 5-257447

[51] Int. Cl.$^6$ ...................................................... B60T 8/66
[52] U.S. Cl. ............................................. 303/167; 303/171
[58] Field of Search ................................. 303/93–96, 102, 303/103, 108, 109, 110; 364/426.02

[56] References Cited

U.S. PATENT DOCUMENTS 4,980,831  12/1990  Katayama et al. ..................... 303/98 X
5,184,876   2/1993  Beyer et al. ............................. 303/106

FOREIGN PATENT DOCUMENTS 64-63452   3/1989   Japan .

Primary Examiner—Josie A. Ballato
Attorney, Agent, or Firm—Foley & Lardner

[57] ABSTRACT

An anti-lock braking system of a motor vehicle has at least three road wheels. The system comprises respective hydraulically actuating units for the road wheels. Each actuating unit feeds a brake cylinder of the corresponding road wheel with a brake pressure upon braking. A control device for controlling the magnitude of the brake pressure comprises wheel speed sensors for producing pulse signals representing the respective rotation speeds of the road wheels, a first device for deriving respective rotation speeds of the road wheels from the pulse signals, a second device for deriving a first estimated vehicle speed based on the maximum one of the respective rotation speeds, a third device for determining the maximum rotation speed as a reference rotation speed when the first estimated vehicle speed is higher than a predetermined value and for determining the third highest one of the respective rotation speeds as the reference rotation speed when the first estimated vehicle speed is lower than the predetermined value; a fourth device for deriving a second estimated vehicle speed based on the reference rotation speed; and a fifth device for controlling the magnitude of the brake pressure in accordance with the second estimated vehicle speed and the rotation speed of the wheel.

4 Claims, 5 Drawing Sheets

ANTI-LOCK BRAKING SYSTEM

BACKGROUND OF THE INVENTION

1. Field of the Invention

The present invention relates in general to brakes for a wheeled motor vehicle, and more particularly to anti-lock braking systems for the vehicle, which automatically controls wheel slip or prevents sustained wheel-locking on braking. More specifically, the present invention is concerned with the anti-lock braking systems of a type which is suitable to a motor vehicle having at least three road wheels.

2. Description of the Prior Art

In the anti-lock braking systems of the above-mentioned type, when, due to hard braking or the like, the road wheels are about to be locked, the brake pressure applied to the brake cylinders of the wheels somewhat reduced and then somewhat increased in a manner not to cause the wheel-locking. That is, until the time when the speed ratio of the wheel speed to the vehicle speed comes to a critical value which may cause the wheel-locking, the brake pressure in the brake cylinders is kept constant, but when the speed ratio exceeds the critical value, the brake pressure is decreased, and when the pressure decreasing comes to a certain degree, the brake pressure is increased. With repetition of such decrease and increase in the brake pressure, the anti-lock braking is carried out with a permissible slippage of the wheels.

In order to compensate an unavoidable phenomenon wherein the wheel speed does not accurately correspond to the real vehicle speed while the wheel slip is taking place, a measure has been proposed by Japanese Patent First Provisional Publication 64-63452. In this measure, respective speed sensors are provided for the four road wheels, and pulse signals outputted from the sensors are processed to calculate the rotation speeds of the respective road wheels. Using the maximum one of the calculated four wheel speeds as a reference wheel speed, an estimated vehicle speed is derived. Based on the estimated vehicle speed, a slip rate of each road wheel and acceleration of the same, the anti-lock braking is carried out for effecting the compensation of the phenomenon.

SUMMARY OF THE INVENTION

It is an object of the present invention to provide an anti-lock braking system which is based on the system proposed by the above-mentioned Japanese Patent First Provisional Publication 64-63452.

According to the present invention, there is provided an anti-lock braking system which can exhibit an excellent anti-lock braking operation even under a condition wherein vibration of a suspended portion (viz., vehicle body) and that of a non-suspended portion (viz., road wheels) tend to make an undesired resonation upon braking.

According to a first aspect of the present invention, there is provided an anti-lock braking system of a motor vehicle having at least three road wheels. The system comprises respective hydraulically actuating units for the road wheels, each actuating unit feeding a brake cylinder of the corresponding road wheel with a brake pressure upon braking; and control means for controlling the magnitude of the brake pressure. The control means comprises wheel speed sensors for producing pulse signals representing the respective rotation speeds of the road wheels; means for deriving respective rotation speeds of the road wheels from the pulse signals; means for deriving a first estimated vehicle speed based on the maximum one of the respective rotation speeds; means for determining the maximum rotation speed as a reference rotation speed when the first estimated vehicle speed is higher than a predetermined value and for determining the third highest one of the respective rotation speeds as the reference rotation speed when the first estimated vehicle speed is lower than the predetermined value; means for deriving a second estimated vehicle speed based on the reference rotation speed; and means for controlling the magnitude of the brake pressure in accordance with the second estimated vehicle speed and the rotation speed of the wheel.

According to a second aspect of the present invention, there is provided an anti-lock braking system of a motor vehicle having at least three road wheels. The system comprises respective hydraulically actuating units for the road wheels, each actuating unit feeding a brake cylinder of the corresponding road wheel with a brake pressure upon braking; and control means for controlling the magnitude of the brake pressure. The control means comprises wheel speed sensors for producing pulse signals representing the respective rotation speeds of the road wheels; means for deriving respective rotation speeds of the road wheels from the pulse signals; means for deriving a first estimated vehicle speed based on any one of the respective rotation speeds; means for determining the selected rotation speed as a reference rotation speed when the first estimated vehicle speed is higher than a predetermined value and for determining the third highest one of the respective rotation speeds as the reference rotation speed when the first estimated vehicle speed is lower than the predetermined value; means for deriving a second estimated vehicle speed based on the reference rotation speed; and means for controlling the magnitude of the brake pressure in accordance with the second estimated vehicle speed and the rotation speed of the wheel.

BRIEF DESCRIPTION OF THE DRAWINGS

Other objects of the present invention will become apparent from the following description when taken in conjunction with the accompanying drawings, in which.

DETAILED DESCRIPTION OF THE INVENTION

Figure 1:
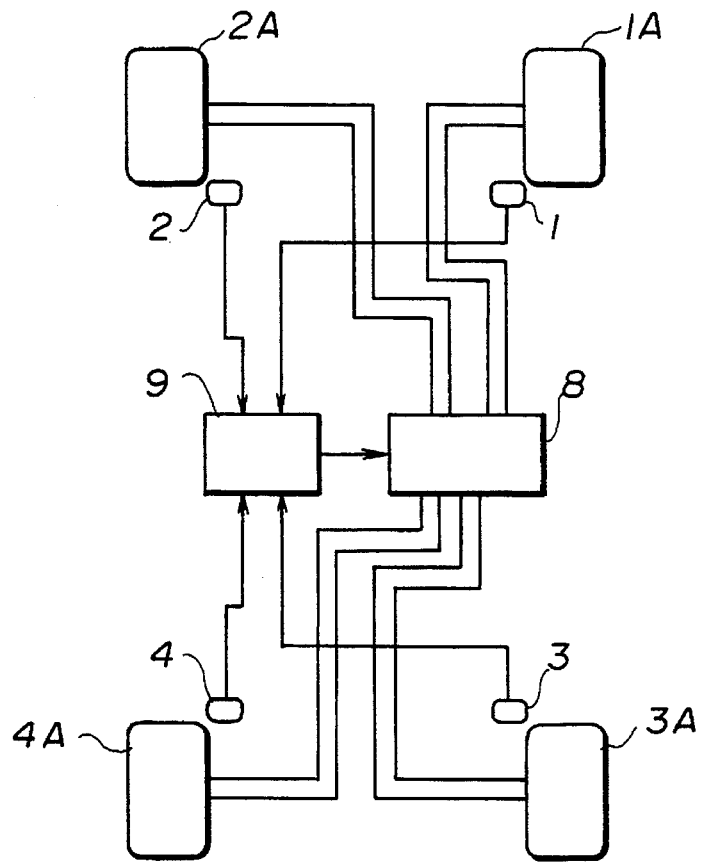
FIG. 1 is a block diagram of an anti-lock braking system according to the present invention, which is applied to a motor vehicle having two front road wheels and two rear road wheels.

Referring to FIG. 1 of the drawings, there is schematically shown an anti-lock braking system according to the present invention, which is applied to a motor vehicle having a front right wheel 1A, a front left wheel 2A, a rear right wheel 3A and a rear left wheel 4A. Designated by numerals 1, 2, 3 and 4 are wheel speed sensors, each producing a pulse signal representative of the rotation speed of the wheel.

Figure 2:
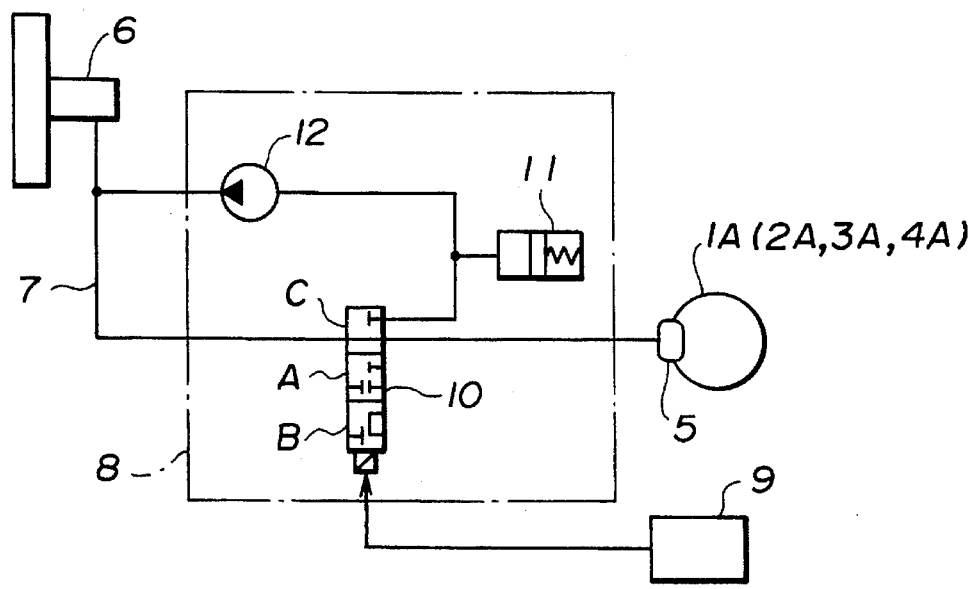
FIG. 2 is one of four identical brake pressure circuits installed in the anti-lock braking system of the invention.

As is understood from FIG. 2, the wheels 1A, 2A, 3A are 4A are equipped with respective brake cylinders 5 which are connected through respective main fluid passages 7 with a common master cylinder 6. Thus, four identical brake fluid circuits are defined for the wheels 1A, 2A, 3A and 4A, each including the brake cylinder 5 and the main fluid passage 7. When a brake pedal (not shown) is depressed, the master cylinder 6 produces a certain brake pressure in each main fluid passage 7.

Four actuator units 8 are respectively provided for the four identical brake fluid circuits, which are incorporated into the main fluid passages 7 of the brake circuits and controlled by a common control unit 9. The control unit 9 receives the pulse signals produced by the wheel speed sensors 1, 2, 3 and 4 (see FIG. 1).

Each actuator unit 8 comprises an electromagnetic switch valve 10 which has three positions "A", "B" and "C" to selectively keep, decrease and increase the brake pressure in the brake cylinder 5, a reservoir tank 11 which functions to reserve the brake fluid from the main fluid passage 7 (more specifically, from the brake cylinder 5) when the switch valve 10 takes the position "B" to decrease the pressure in the brake cylinder 5, and a fluid pump 12 which functions to feed the brake pressure from the reservoir tank 11 to the main fluid passage 7 when the switch valve 10 takes the position "C" to increase the pressure in the brake cylinder 5.

Figure 4:
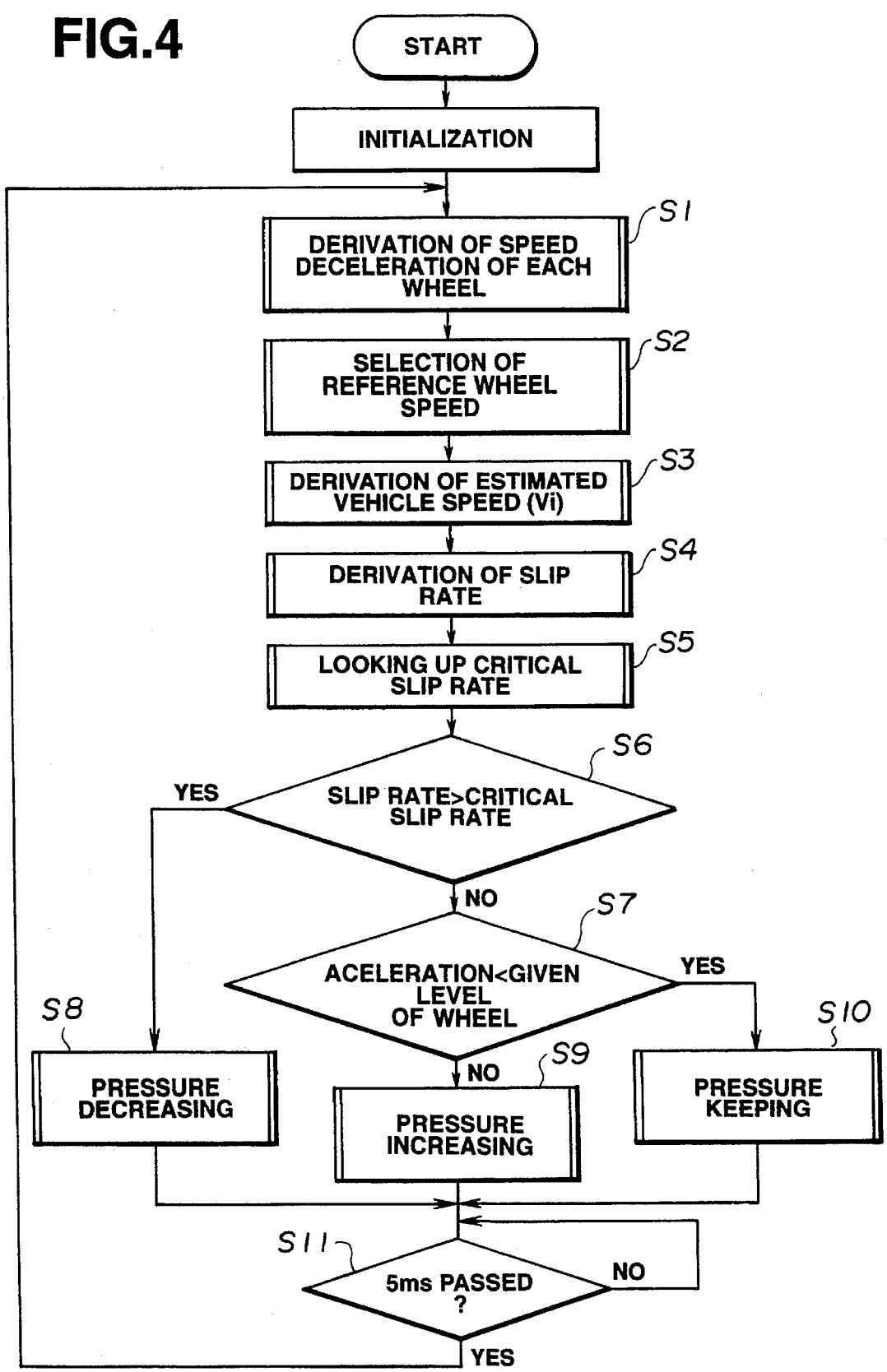
FIG. 4 is a flowchart depicting programmed operation steps which are carried out in a computer employed in the anti-lock braking system of the invention.

The switch valve 10 is connected to the control unit 9 and controlled by the same in such a manner as is depicted by the flowchart of FIG. 4.

As is seen from the flowchart, upon braking, the data processing in the computer is initialized and at step S1, the rotation speed of each wheel 1A, 2A, 3A or 4A is derived from the pulse signal produced by the wheel speed sensor 1, 2, 3 or 4. Based on the rotation speed thus derived, acceleration of each wheel 1A, 2A, 3A or 4A is also derived.

Then, at step S2, a reference wheel speed is selected from the derived four wheel speeds in a manner as will be described hereinafter.

Figure 3:
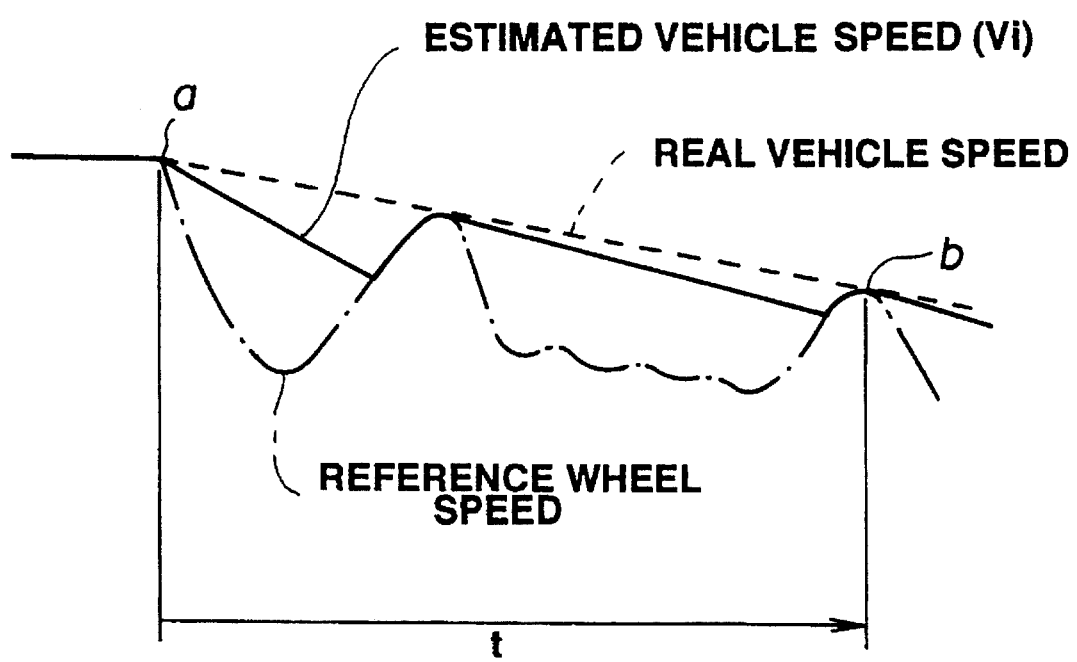
FIG. 3 is a graph showing the relationship between a reference wheel speed, an estimated vehicle speed and a real vehicle speed with respect to an elapsed time.

After selection of the reference wheel speed, the operation flow goes to step S3. At this step, an estimated vehicle speed "Vi" (which is referred to as a second estimated vehicle speed in Claims) is calculated by using the following equation.

$$Vi = Vo - K1 \quad (1)$$

wherein:
Vo: reference wheel speed at the time when braking starts (viz., the wheel speed at point "a" of the graph of FIG. 3),
K1: speed reduction factor of the associated vehicle, determined by a braking system used.

And, acceleration "Vk" of the wheel 1A, 2A, 3A or 4A whose speed has been selected as the reference wheel speed is calculated from the following equation.

$$Vk = (Vo - Vp)/t \quad (2)$$

wherein:
Vp: extremal value of the reference wheel speed (viz., the wheel speed at point "b" of the graph of FIG. 3).

Then, at step S4, based on the estimated vehicle speed "Vi" and the rotation speed of each wheel 1A, 2A, 3A or 4A, a slip rate of each wheel is calculated.

Then, at step S5, a critical slip rate at which the friction between the corresponding wheel and the road is critical with respect to the slippage of the wheel is looked up from a stored data map.

Then, at step S6, the slip rate derived at step S4 and the critical slip rate looked up at S5 are compared. When the slip rate is greater than the critical slip rate, the operation flow goes to step S8 to decrease the brake pressure. That is, by the instruction signal from the control unit 9, the switch valve 10 takes the position "B" wherein the brake cylinder 5 is communicated with the reservoir tank 11 while being separated from the master cylinder 6. While, when, at step S6, the slip rate is smaller than the critical slip rate, the operation flow goes to step S7. At this step S7, the acceleration of each wheel derived at step S1 and a given level determined based on the acceleration "Vk" derived at step S3 are compared.

When the acceleration is smaller than the given level, the operation flow goes to step S9 to keep the brake pressure. That is, in this condition, the slip rate is not large (which means that the lock tendency of the wheel is small) and the acceleration of the wheel is small (or negative), and thus the wheel is going to stop. In this condition, by receiving the instruction signal from the control unit 9, the switch valve 10 takes the position "A" wherein the brake cylinder 5 is separated from both the master cylinder 6 and the reservoir tank 11. While, when, at step S7, the acceleration is greater than the given level, the operation flow goes to step S10 to increase the brake pressure. That is, in this condition, the slip rate is not large and the wheel speed is going to increase, and thus the wheel acceleration is great (or positive). In this condition, and by receiving the instruction signal from the control unit 9, the switch valve 10 takes the position "C" wherein brake cylinder 5 is communicated with the master cylinder 6 while being separated from the reservoir tank 11. Upon the switch valve 10 taking this position "C", the fluid pump 12 becomes energized thereby increasing the brake pressure in the brake cylinder 5.

When either one of the steps S8, S9 and S10 is completed, the operation flow goes to step S11. At this step, a judgment is carried out as to whether 5ms (five milliseconds) has passed or not. If Yes, that is, if 5ms has passed, the operation flow returns to step S1. Thus, the above-mentioned programmed operation is carried out every five milliseconds.

Figure 5:
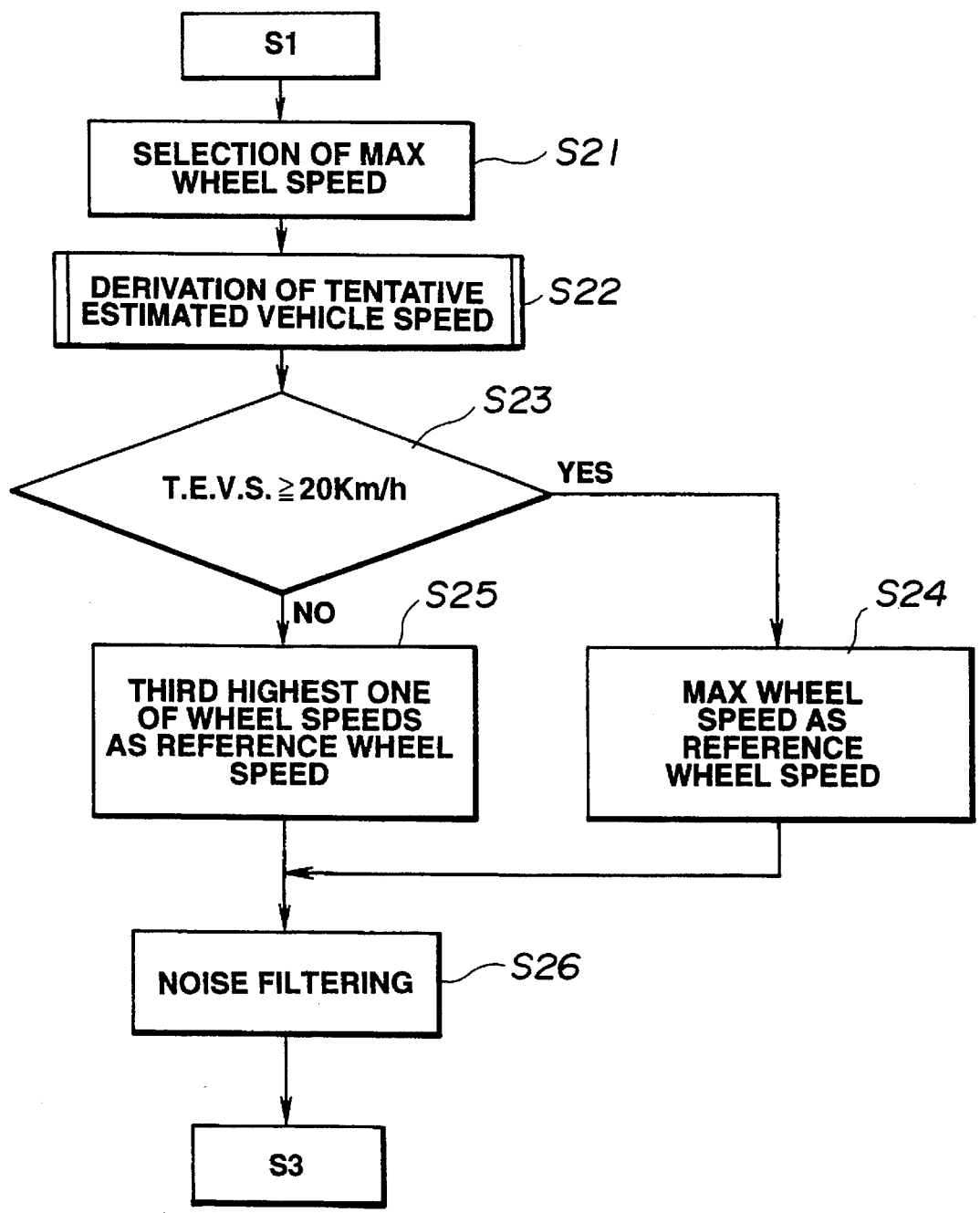
FIG. 5 is a flowchart depicting the detail of one of the operation steps of the flowchart of FIG. 4.

In accordance with the present invention, the following operation steps are further carried out for selecting the reference wheel speed (step S2), which are depicted in the flowchart of FIG. 5.

That is, at step S21, the maximum one of the rotation speeds of the four wheels derived at step S1 is selected. Then, at step S22, based on the selected maximum wheel rotation speed, a tentative estimated vehicle speed (which is referred to as a first estimated vehicle speed in Claims) is calculated using the afore-mentioned equation (1). Then, at step S23, the tentative estimated vehicle speed thus derived is compared with a predetermined value, that is, 20 Km/h. It is to be noted that the speed 20 Km/h is the maximum (or critical) speed at which upon braking, undesired resonation tends to occur between vibration of the suspended portion (viz., vehicle body) and that of the non-suspended portion (viz., road wheels). Thus, the predetermined value is equal to or smaller than 20 Km/h.

When, at step S23, when the tentative estimated vehicle speed is higher than or equal to 20 Km/h, the operation flow goes to step S24. At this step, the maximum wheel rotation speed selected at step S21 is determined as the reference wheel speed. While, when the tentative estimated vehicle speed is lower than 20 Km/h, the operation flow goes to step S25. At this step, the third highest one of the four rotation speeds of the wheels 1A, 2A, 3A and 4A derived at step S1 is determined as the reference wheel speed.

When either one of the steps S24 and S25 is completed, the operation flow goes to step S26. At this step, a noise filtering operation is carried out.

Then, the reference wheel speed thus derived at step S24 or S25 is used for calculating the estimated vehicle speed at step S3.

As is understood from the foregoing description, in the present invention, when, due to braking, the motor vehicle comes to a condition wherein the undesired resonation tends to occur between vibration of the suspended portion and that of the non-suspended portion of the vehicle, the selected wheel rotation speed for derivation of the estimated vehicle speed "Vi" is changed from the highest one to the third highest one of the four wheel rotation speeds.

In case of a motor vehicle having two front road wheels and two rear road wheels, the third highest one of the rotation speeds of the four road wheels is the rotation speed possessed by one of the two rear wheels upon braking.

Figure 6:
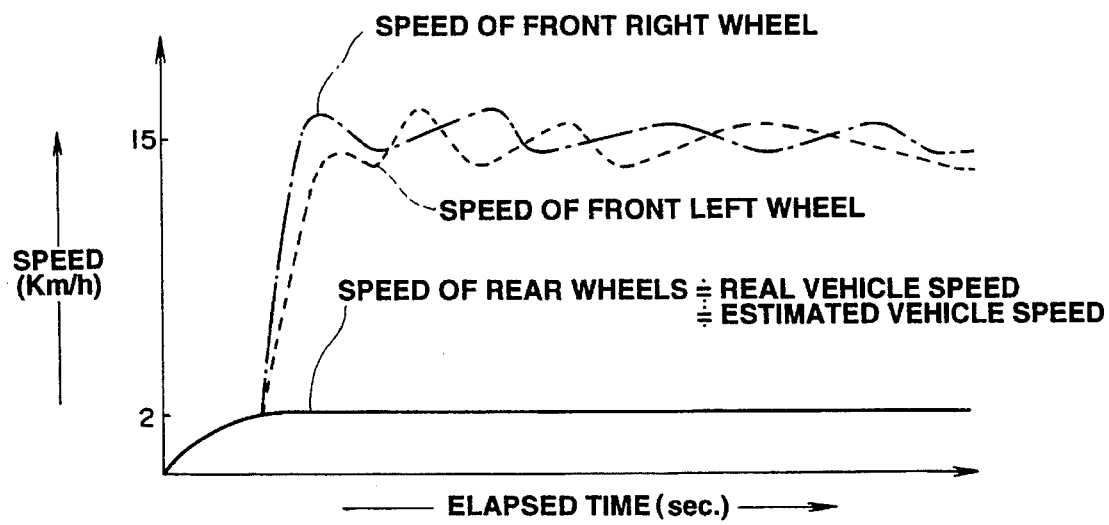
FIG. 6 is a graph showing the relationship between speeds of the two front wheels, the estimated vehicle speed and the real vehicle speed.
Figure 7:
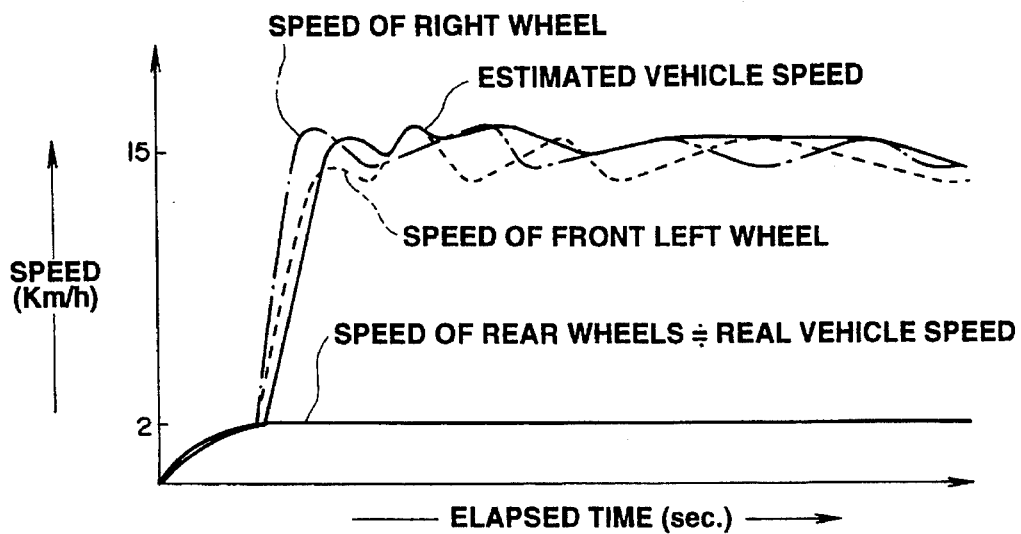
FIG. 7 is a graph similar to FIG. 6, but showing the case proposed by the above-mentioned Japanese Patent Second Provisional Publication.

As is seen from the graph of FIG. 6, upon braking, the rear wheels show a rotation speed appropriate for deriving the estimated vehicle speed "Vi" which very approximates to the real vehicle speed. If, as is seen from FIG. 7, the measure of the present invention is not practically employed upon braking, the rotation speed of the front wheels is used for derivation of the estimated vehicle speed. However, as is understood from the graph, the estimated vehicle speed thus obtained is very different from the real vehicle speed.

Furthermore, if, upon braking, the driving road wheels show a wheel spinning, the third highest one of the four wheel rotation speeds becomes the rotation speed which is indicated by one of the non-driving road wheels. Thus, the estimated vehicle speed "Vi" can indicate a value which is much closer to the real vehicle speed.

Although the foregoing description is directed to the motor vehicle having two front road wheels and two rear road wheels, the present invention can be also applied to other type motor vehicles so long as they have at least three road wheels.

Furthermore, although, in the foregoing description, the maximum one of the wheel rotation speeds of the four wheels is selected at step S21 for derivation of the tentative estimated vehicle speed, any one of the wheel rotation speeds may be selected in the present invention. In this case, the reference wheel speed obtained at step S24 is thus the wheel rotation speed selected at step S21.

Although the above description is directed to an anti-lock braking system, the concept of the present invention is applicable to various fields so long as the fields employ a technique in which the vehicle speed is estimated from the road wheel speeds.

What is claimed is:

1. An anti-lock braking system of a motor vehicle having at least three road wheels, comprising:

respective hydraulically actuating units for the road wheels, each actuating unit feeding a brake cylinder of the corresponding road wheel with a brake pressure upon braking; and control means for controlling the magnitude of said brake pressure, said control means comprising:

wheel speed sensors for producing pulse signals representing the respective rotation speeds of the road wheels;

means for deriving respective rotation speeds of the road wheels from said pulse signals;

means for deriving a first estimated vehicle speed based on the maximum one of the respective rotation speeds;

means for determining said maximum rotation speed as a reference rotation speed when said first estimated vehicle speed is higher than a predetermined value and for determining the third highest one of the respective rotation speeds as said reference rotation, speed when said first estimated vehicle speed is lower than said predetermined value;

means for deriving a second estimated vehicle speed based on said reference rotation speed; and means for controlling the magnitude of said brake pressure in accordance with said second estimated vehicle speed and the derived respective rotation speed of the corresponding wheel, wherein said predetermined value indicates the maximum or critical speed of the vehicle at which undesired resonation tends to occur between vibration of a suspended portion of the vehicle and that of a non-suspended portion of the same upon braking.

2. An anti-lock braking system as claimed in claim 1, in which said predetermined value is smaller than 20 Km/h.

3. An anti-lock braking system as claimed in claim 1, further comprising means which carries out a noise filtering when determination of said reference rotation speed is completed.

4. An anti-lock braking system of a motor vehicle having at least three road wheels, comprising:

respective hydraulically actuating units for the road wheels, each actuating unit feeding a brake cylinder of the corresponding road wheel with a brake pressure upon braking; and control means for controlling the magnitude of said brake pressure, said control means comprising:

wheel speed sensors for producing pulse signals representing the respective rotation speeds of the road wheels;

means for deriving respective rotation speeds of the road wheels from said pulse signals;

means for deriving a first estimated vehicle speed based on any one of the respective rotation speeds;

means for determining the selected rotation speed as a reference rotation speed when said first estimated vehicle speed is higher than a predetermined value and for determining the third highest one of the respective rotation speeds as said reference rotation speed when said first estimated vehicle speed is lower than said predetermined value;

means for deriving a second estimated vehicle speed based on said reference rotation speed; and means for controlling the magnitude of said brake pressure in accordance with said second estimated vehicle speed and the derived respective rotation speed of the corresponding wheel, wherein said predetermined value indicates the maximum or critical speed of the vehicle at which undesired resonation tends to occur between vibration of a suspended portion of the vehicle and that of a non-suspended portion of the same upon braking.

* * * * *